United States Patent
Mehs et al.

(10) Patent No.: US 8,646,823 B2
(45) Date of Patent: Feb. 11, 2014

(54) COVER FEATURES FOR VEHICLE-MOUNTED DEVICES

(75) Inventors: Andreas Mehs, Novi, MI (US); Oliver Schwindt, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 665 days.

(21) Appl. No.: 12/720,216

(22) Filed: Mar. 9, 2010

(65) Prior Publication Data
US 2010/0237655 A1  Sep. 23, 2010

Related U.S. Application Data

(60) Provisional application No. 61/162,442, filed on Mar. 23, 2009.

(51) Int. Cl.
*B60J 11/00* (2006.01)

(52) U.S. Cl.
USPC ...................... 296/37.1; 296/136.01

(58) Field of Classification Search
USPC ...................... 296/37.1, 1.07, 136.01; 29/559; 362/459–463; 343/711–713
See application file for complete search history.

(56) References Cited

U.S. PATENT DOCUMENTS

| | | | |
|---|---|---|---|
| 5,029,051 A * | 7/1991 | Shirai et al. ............... | 362/462 |
| 6,729,429 B2 | 5/2004 | Takahashi | |
| 7,212,168 B2 * | 5/2007 | Kozlovski ................. | 343/713 |
| 7,345,271 B2 | 3/2008 | Boehlau et al. | |
| 7,403,709 B2 | 7/2008 | Miyazaki et al. | |
| 7,499,100 B2 | 3/2009 | Miyazaki et al. | |
| 8,118,501 B2 | 2/2012 | Buschmann | |
| 2004/0164228 A1 | 8/2004 | Fogg et al. | |
| 2006/0028745 A1 | 2/2006 | Yamada | |
| 2008/0310040 A1 | 12/2008 | Suzuki et al. | |

FOREIGN PATENT DOCUMENTS

| | | |
|---|---|---|
| DE | 19642811 | 4/1998 |
| DE | 102006054325 | 5/2008 |
| DE | 102007005322 | 7/2008 |
| EP | 0905526 | 3/1999 |
| WO | 2005071434 | 8/2005 |

OTHER PUBLICATIONS

Search Report from the European Patent Office for Application No. 10002835 dated Aug. 30, 2012 (6 pages).

* cited by examiner

*Primary Examiner* — Glenn Dayoan
*Assistant Examiner* — Melissa A Black
(74) *Attorney, Agent, or Firm* — Michael Best & Friedrich LLP (57) ABSTRACT

A cover assembly is provided for a vehicle-mounted device having an alignment feature on a face of the device. The cover assembly includes a rod portion, a securing arrangement coupled to the rod portion to secure the cover assembly to the device, and a cover portion coupled to the rod portion and configured to cover the alignment feature on the face of the device.

21 Claims, 6 Drawing Sheets

COVER FEATURES FOR VEHICLE-MOUNTED DEVICES

RELATED APPLICATIONS

This application claims the benefit of U.S. Provisional Patent Application No. 61/162,442 filed Mar. 23, 2009, the entire content of which is incorporated herein by reference.

BACKGROUND

The present invention relates to vehicle-mounted devices.

Various devices on a vehicle are designed to be aligned to the vehicle's drive axis (both pointing in the forward drive direction and the rearward drive direction) in order to effectively point them in the proper direction for optimum performance. Such devices can include, but are not limited to, cameras, radar sensors, lidar sensors, and headlights. These devices may include features, such as mirrors and adjustment fasteners, coupled with the device to facilitate alignment of the device to the vehicle's drive axis at the vehicle assembly plant.

Once the device has been aligned with the drive axis of the vehicle, the mirrors, adjustment fasteners, or other alignment features are not needed for normal operation of the device. It is therefore known to provide expensive radomes or protective covers that cover substantially the entire device except for the portion (if any) that emits signals or beams (e.g., radio or light). Alternatively, a portion of the vehicle's fascia, molding, or other structure can be specially designed to hide the device from view, thereby improving the overall aesthetics of the vehicle. Covering the device with known radomes, whole-sensor covers, or vehicle fascia requires customization of the covering feature for each vehicle application to work within the given space constraints of different vehicles.

SUMMARY

In one embodiment, the invention provides cover features for vehicle-mounted devices that provide the desired aesthetic covering function, without the need for expensive customization based on the specific vehicle application and space constraints.

More specifically, the invention provides a cover assembly for a vehicle-mounted device having an alignment feature on a face of the device. The cover assembly includes a rod portion, a securing arrangement coupled to the rod portion to secure the cover assembly to the device, and a cover portion coupled to the rod portion and configured to cover the alignment feature on the face of the device.

The invention further provides a vehicle-mounted device assembly including a vehicle-mounted device having an alignment feature on a face of the device, and a cover assembly. The cover assembly includes a cover portion configured to cover the alignment feature on the face of the device, and is mounted in an aperture on the device proximate to the alignment feature.

In one embodiment, the alignment feature on the device is a mirror, the securing arrangement is operable to secure the rod portion in an unused fastener aperture of the device, and the cover portion extends substantially perpendicularly from the rod portion to cover the mirror. In one embodiment, the cover assembly is rotatable relative to the device such that the cover portion is movable between a first position, in which the cover portion does not cover the alignment feature, and a second position, in which the cover portion at least partially covers the alignment feature. In another embodiment, the cover assembly is not rotatable relative to the device, and includes anti-rotation members in the form of arms or other features that prevent the cover assembly from rotating relative to the device. The cover assembly can easily snap or screw into an unused fastener aperture or other aperture of the device to make assembly easy for an operator at the vehicle assembly plant. Additional covers in the form of caps can be applied over fixing and adjusting fasteners of the device to further cover portions of the device from view.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
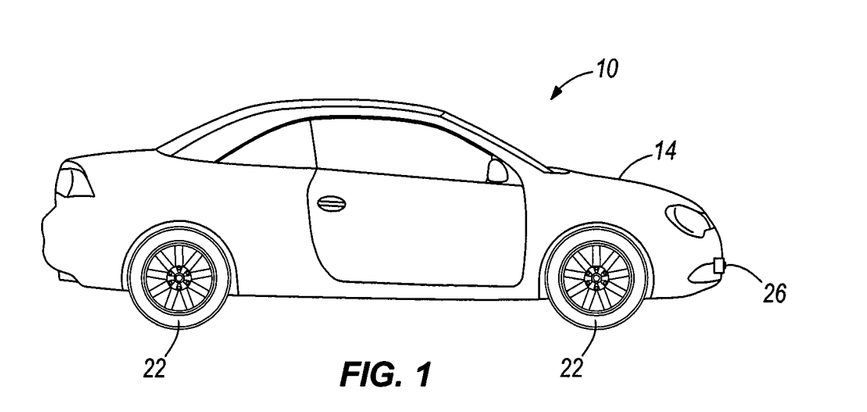
FIG. 1 illustrates a vehicle having a device mounted thereto.

The invention is illustrated and described with respect to the figures. As shown in FIG. 1, a vehicle 10 includes a body 14 and a plurality of wheels 22 and/or other means of contacting the ground to guide the vehicle 10, and defines a drive axis of the vehicle 10. While the vehicle 10 of the illustrated construction is an automobile, the invention can be used or adapted for use on other types of vehicles as well. In addition to automobiles, the invention is useful on any vehicle including one or more precision devices or components that depend on alignment with the drive axis for proper operation. In other embodiments, it may be desirable to align the precision device/component perpendicularly with a defined vehicle axis or at another specified angle. Such alternative vehicles include, but are not limited to, motorcycles, recreational off-road vehicles such as ATV's and snowmobiles, off-highway vehicles, aircraft, watercraft etc.

After the body 14 and the chassis (which carries the wheels 22) are joined together, an axis of the vehicle body 14 can be offset from the drive axis of the vehicle 10 due to tolerance stack-up of vehicle components. Even a slight offset angle (e.g., 3 degrees) between the body axis and the drive axis can cause a loss of performance and/or operation of various sensors and/or devices 26 that are designed to be aligned with the drive axis for precision but are physically associated (coupled directly or indirectly) with the body 14. The body-mounted devices 26 may include, but are not limited to, cameras, radar sensors, lidar sensors, and headlights.

In one construction, one of the body-mounted devices 26 is a radar (radio-based) or lidar (light-based) sensor for the vehicle 10 (a first automobile) that is part of a safety system configured to detect an object, such as a second automobile, in front of the vehicle 10 and take corresponding action. These systems are known as Adaptive Cruise Control (ACC), Forward Collision Warning (FCW) systems, or Collision Mitigation Systems (CMS). The sensor 26 is configured to monitor a distance to the second automobile and also a change in that distance relative to time (relative velocity), and furthermore a rate of change in the relative velocity (relative acceleration). The sensor 26 may be coupled to a controller such as a micro-processor that uses algorithms to determine if an unsafe condition is occurring, such as the second automobile coming to a panic stop in front of the vehicle 10. The controller can then take a responsive action such as alerting the driver of the vehicle 10 or activating the brakes of the vehicle 10, for example. The orientation of the radar or lidar sensor relative to the body 14 is configured to be dynamically responsive to changes in the drive axis to maintain its alignment therewith during travel of the vehicle 10 along a non-neutral drive axis. This may be accomplished by monitoring and responding to changes in a steering angle that determines the drive axis. Precise alignment of the sensor with the drive axis at all times is important for maintaining proper function of the safety system over its range of operating conditions.

An angular offset between the body axis and the drive axis (e.g., 3 degrees) that is relatively common in production automobiles and seemingly insignificant, may easily impair the operation of a safety system as described above. Therefore, it is common to have the device 26 properly aligned to the drive axis at the vehicle assembly plant.

Figure 2:
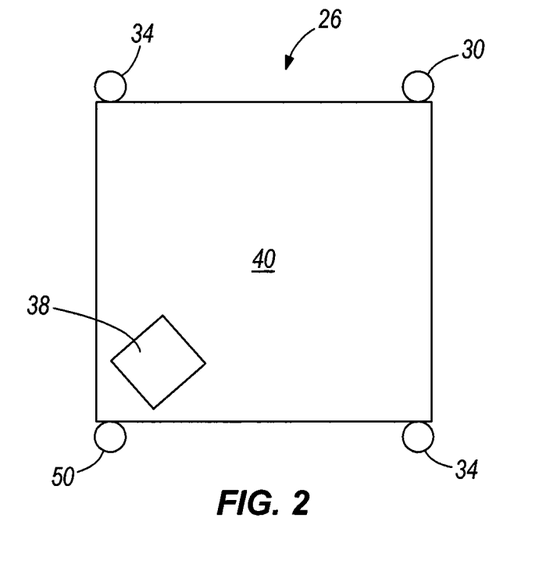
FIG. 2 schematically illustrates a device in the form of a sensor.

FIG. 2 schematically illustrates a conventional sensor 26 of the type described above for use in ACC or FCW systems or CMS. The illustrated sensor 26 is shown as it would appear from the front of the vehicle 10 (assuming a forward-acting sensor). The sensor 26 typically includes four fastener (e.g., screw) holes that can cumulatively accept one of a fixing fastener 30 that fixes the sensor 26 to the vehicle 10, and one or more adjustment fasteners 34 that can be used for adjusting the sensor 26 to the vehicle's drive axis. As shown in FIG. 2, there is commonly one fixing fastener 30 and two adjustment fasteners 34, one to adjust the sensor 26 horizontally and one to adjust the sensor 26 vertically to the drive axis. The locations for the three fasteners are arbitrary among the four holes and can be chosen, for example, based on accessibility and/or space constraints surrounding the sensor 26. However, the fixing fastener 30 is typically between or directly adjacent to the two adjustment fasteners 34, leaving the unused fastener hole 50 at a diametrically-opposed location from the fixing fastener 30 on the sensor 26.

An alignment feature in the form of a mirror 38 is also shown coupled with the sensor 26 in FIG. 2. The mirror 38 is positioned on the same face or side 40 of the sensor 26 from which the beam or signal emanates. The mirror 38 is used in the sensor alignment process performed in the vehicle assembly plant to align the sensor 26 to the vehicle drive axis. Other alignment features (e.g., prisms, lenses, reflective devices, etc.) could also be used in place of the mirror 38 depending on the method of alignment used. However, once the alignment process has been performed, the mirror 38 is no longer needed for normal operation of the sensor 26. Therefore, it is desirable to cover the mirror 38 after the alignment process for aesthetic reasons and so that it is not visible. Specifically, consumers and vehicle manufacturers alike want the sensor 26 to be as unnoticeable as possible while still being operable for its intended function.

Current practice is to provide expensive radomes or protective covers that conceal substantially the entire device 26 except for the portion (if any) that emits signals or beams (e.g., radio or light). Alternatively, a portion of the vehicle's fascia, molding, or other structure can be specially designed or modified to hide the device 26 from view, thereby improving the overall aesthetics of the vehicle 10. Covering the device 26 with known radomes, whole-sensor covers, or vehicle fascia requires customization of the covering feature for each vehicle application to work within the given space constraints of different vehicles.

Figure 3:
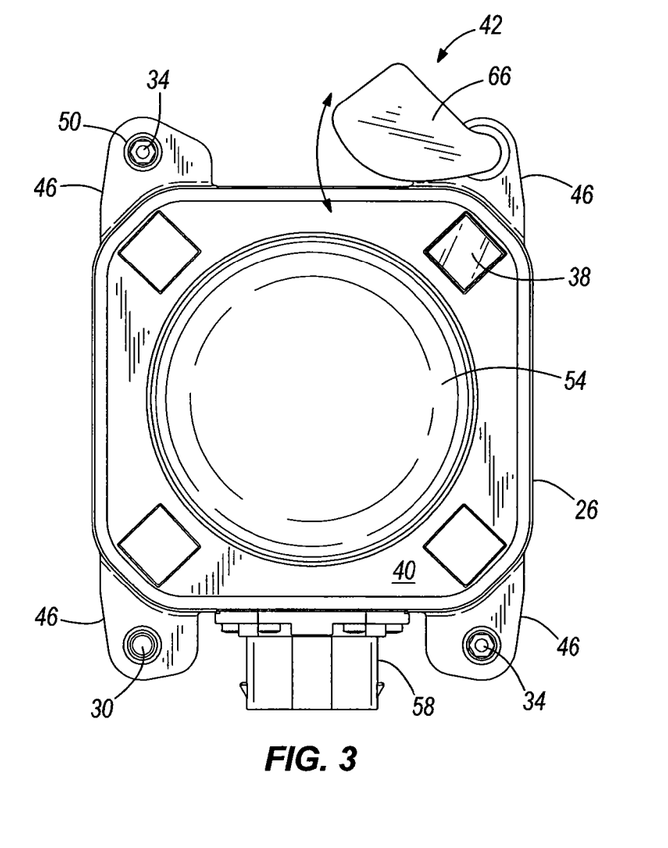
FIG. 3 is a front view of a sensor including a cover assembly embodying the invention, the cover assembly shown in a first, uncovered, position.
Figure 4:
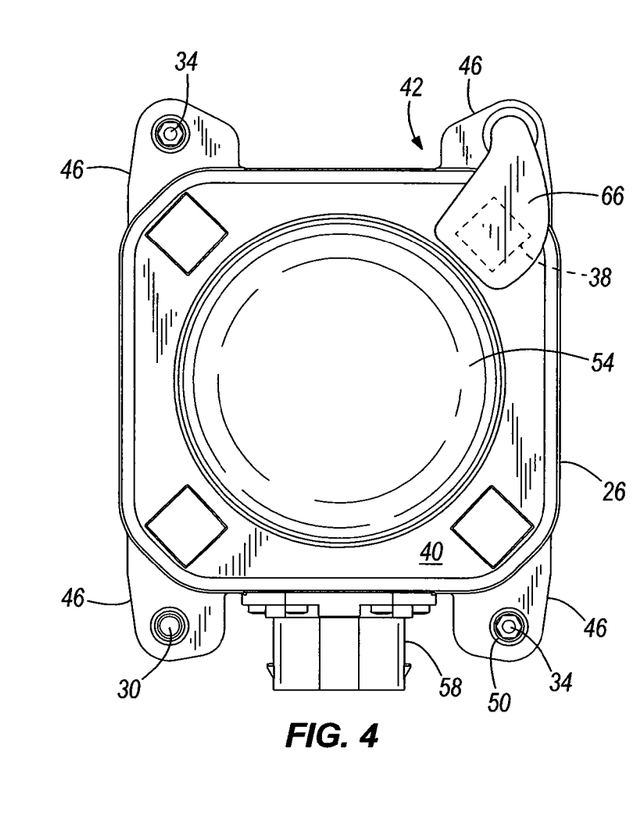
FIG. 4 is a front view of the sensor shown in FIG. 3 with the cover assembly shown in a second, covered, position.
Figure 5:
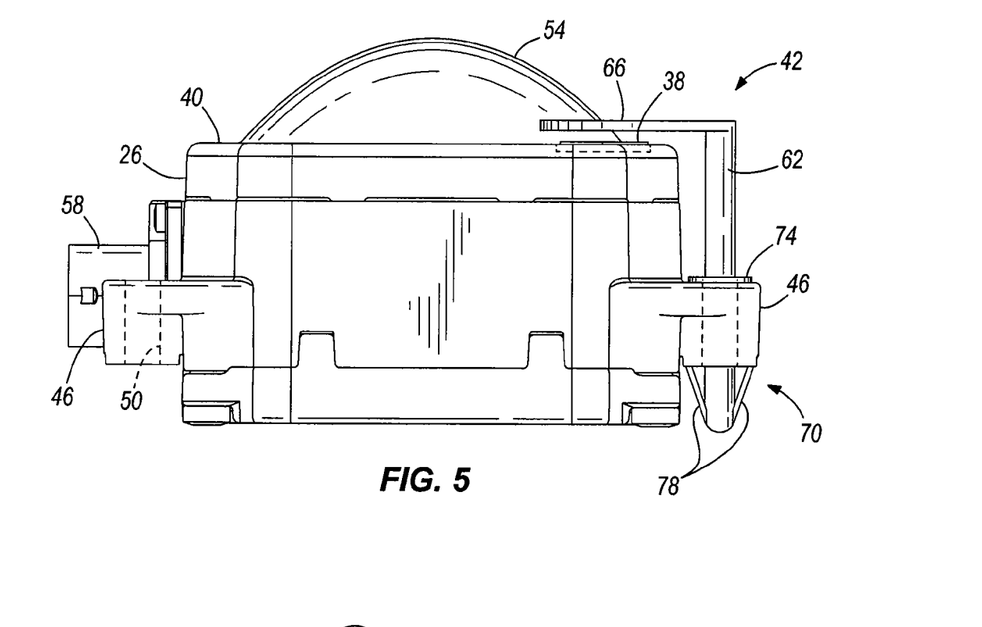
FIG. 5 is a side view of the sensor of FIG. 4 with the cover assembly shown in the covered position.

FIGS. 3-5 illustrate a first embodiment of a cover feature or cover assembly 42 according to the present invention. The cover assembly 42 can be used with the existing sensor 26, which is shown in a bit more detail. The illustrated sensor 26 includes four flanges or mounting portions 46 positioned generally at the four corners of the sensor 26. Each mounting portion 46 includes a respective fastener aperture or hole 50 for receiving any one of the fixing fastener 30 or the adjustment fasteners 34. A dome portion 54 is positioned at the location from which signals, such as radar waves, are emitted from the sensor 26. The mirror 38 is on the same face 40 of the sensor 26 as the dome portion 54, and can stand proud of the face 40, can be flush with the face 40, or can be recessed within the sensor face 40. An electrical connector 58 is also shown for electrically connecting the sensor 26 to the engine control unit or other processing device and/or power supply.

The illustrated cover assembly 42 is configured to cooperate with the unused fastener hole 50, where the unused fastener hole 50 is located at the same corner of the sensor 26 as the mirror 38, or otherwise substantially adjacent to or proximate the mirror 38. Thus, it is desirable to choose the locations of the fixing fastener 30 and the adjustment fasteners 34, or to position the mirror 38 accordingly so as to leave the unused fastener hole 50 at the corner adjacent the mirror 38. In other embodiments of the invention, the sensor 26 could include a hole or aperture that is separate and distinct from the fastener holes 50, yet proximate to the mirror 38, to cooperate with the cover assembly 42 in a similar manner as described below. This might be beneficial in applications where it is difficult or impossible to avoid using the fastener hole 50 adjacent the mirror 38 for the fixing screw 30 or the adjustment screws 34.

As best seen in FIG. 5, the cover assembly 42 includes a rod portion 62, a cover portion 66 coupled to one end of the rod portion 62, and a securing arrangement 70 coupled to the other end of the rod portion 62 opposite the cover portion 66. As illustrated, the cover portion 66 extends substantially perpendicularly from the rod portion 62 so as to extend over the face 40 of the sensor 26, and ultimately over the mirror 38. While the illustrated cover portion 66 is shown as being partially teardrop-shaped (FIGS. 3, 4, 6, and 7) or substantially teardrop-shaped (FIGS. 8 and 8A), other shapes can be used as desired. The illustrated cover assembly 42 is unitarily formed as a single piece of plastic, for example, by molding. However, in other embodiments, the cover assembly 42 can be made from other materials and can be formed from multiple parts connected together (see FIG. 8A).

The illustrated securing arrangement 70 includes a washer or stop member 74 that limits the insertion of the rod portion 62 and the remainder of the securing arrangement into the fastener hole 50 in the mounting portion 46. The illustrated securing arrangement 70 further includes one or more resilient or retractable members or fingers 78 configured to deflect or retract upon insertion into the fastener hole 50, and then to resiliently return to an undeflected state or extend after passing through the fastener hole 50, thereby securing the rod portion 62, and therefore the entire cover assembly 42, from being unintentionally removed axially from the fastener hole 50. Intentional removal can be accomplished by squeezing the retractable members 78 together and then withdrawing the rod portion 62 from the hole 50. With this configuration, the rod portion 62 is snapped into the fastener hole 50. The cover assembly 42 can be assembled with the sensor 26 by the sensor manufacturer, or by an operator either when the sensor 26 is installed onto the vehicle or during or after the sensor alignment process.

One skilled in the art will understand that the illustrated securing arrangement 70 is just one possible configuration that can be used to secure the cover assembly 42 in the fastener hole 50. Other suitable arrangements can also be used. For example, the rod portion 62 could be threaded and screwed into the fastener hole 50. In another alternative, the fingers 78 could be replaced with a pin (e.g., a cotter pin) or a snap ring that would retain the rod portion 62 against axial removal from the fastener hole 50. In yet another arrangement, the rod portion 62 may be releasably press-fit into the fastener hole 50. While the illustrated rod portion 62 has a generally circular cross-section, other cross-sectional configurations can be substituted.

With the illustrated securing arrangement 70, and as best shown in FIGS. 3 and 4, the cover assembly 42 is substantially secured against axial movement relative to the fastener hole 50, but is capable of rotating or swiveling about the rod portion 62. This enables the cover portion 66 to swivel or rotate between a first position (FIG. 3) in which the cover portion 66 does not cover the mirror 38, and a second position (FIG. 4) in which the cover portion 66 covers the mirror 38. With this arrangement, an operator in the assembly plant can move the cover portion 66 to the first or uncovered position during the sensor alignment process, and then move the cover portion 66 to the second or covered position upon completing the alignment process so as to hide the mirror 38 from view. At least the cover portion 66 (and, in the illustrated embodiment, the entire cover assembly 34) is preferably the same color as the remainder of the sensor 26 (e.g., black) so as to blend in with the remainder of the sensor 26 and be aesthetically pleasing.

The illustrated securing arrangement 70 is configured to provide a friction or interference fit that provides some resistance to rotation of the rod portion 62 within the fastener hole 50. This enables the cover portion 66 to generally remain in the desired first or second position unless intentionally moved therefrom by an operator. Furthermore, depending on whether the mirror 38 is recessed within the face 40 of the sensor 26 or stands proud of the face 40, the cover portion 66 can be configured to snap or otherwise secure itself into position over the mirror 38 to help maintain the cover portion 66 in the second, covered position. Additional features (e.g., projections, ribs, recesses, etc.) can be formed on the cover portion 66 to cooperate with mating features (e.g., projections, ribs, recesses, etc.) on the face 40 of the sensor 26 or with the mirror 38 itself. The plastic material used for the cover assembly 42 also provides some flexibility so that the cover portion 66 and rod portion 62 can deflect if needed during movement of the cover portion 66 between the first and second positions.

Figure 6:
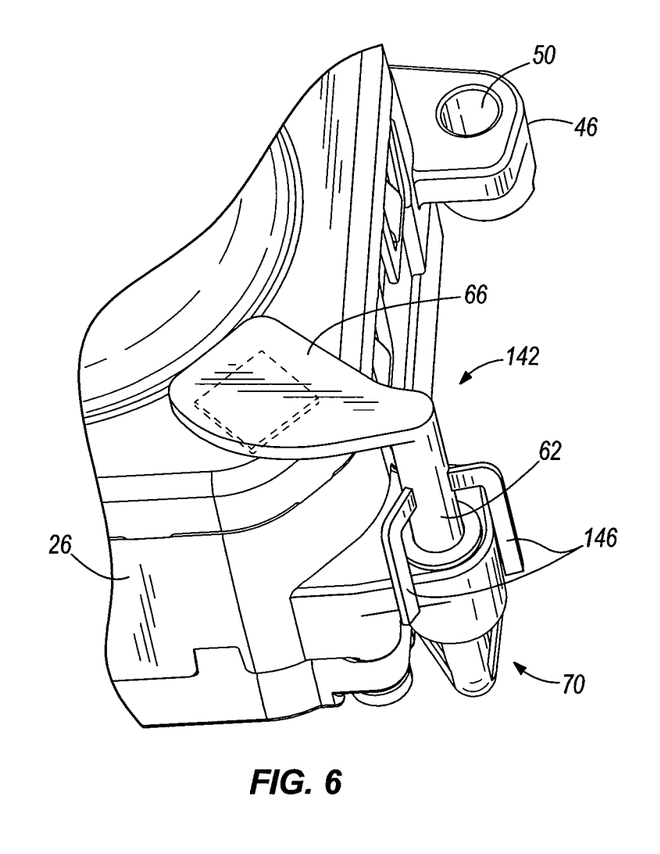
FIG. 6 is a partial perspective view of a sensor assembly including a cover assembly of a second embodiment.
Figure 7:
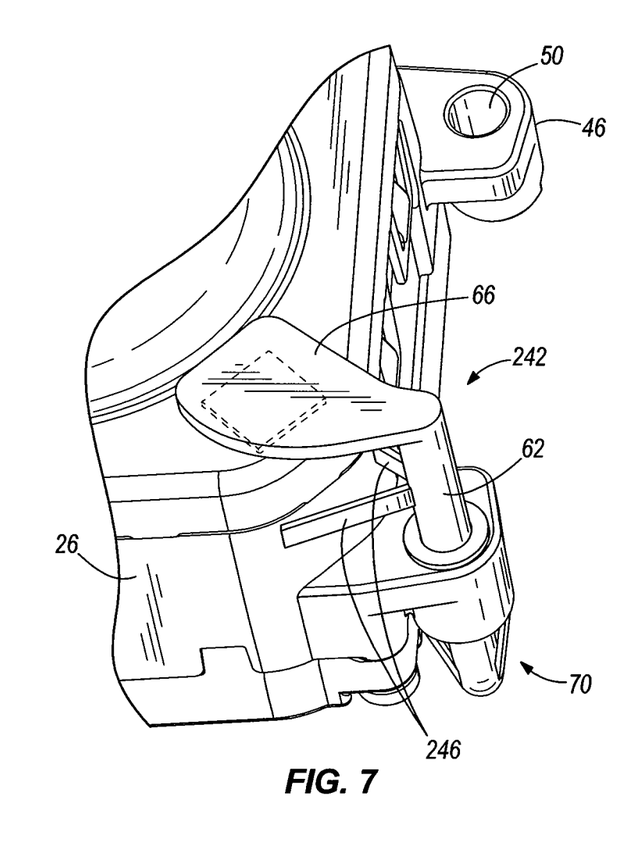
FIG. 7 is a partial perspective view of a sensor assembly including a cover assembly of a third embodiment.
Figure 8:
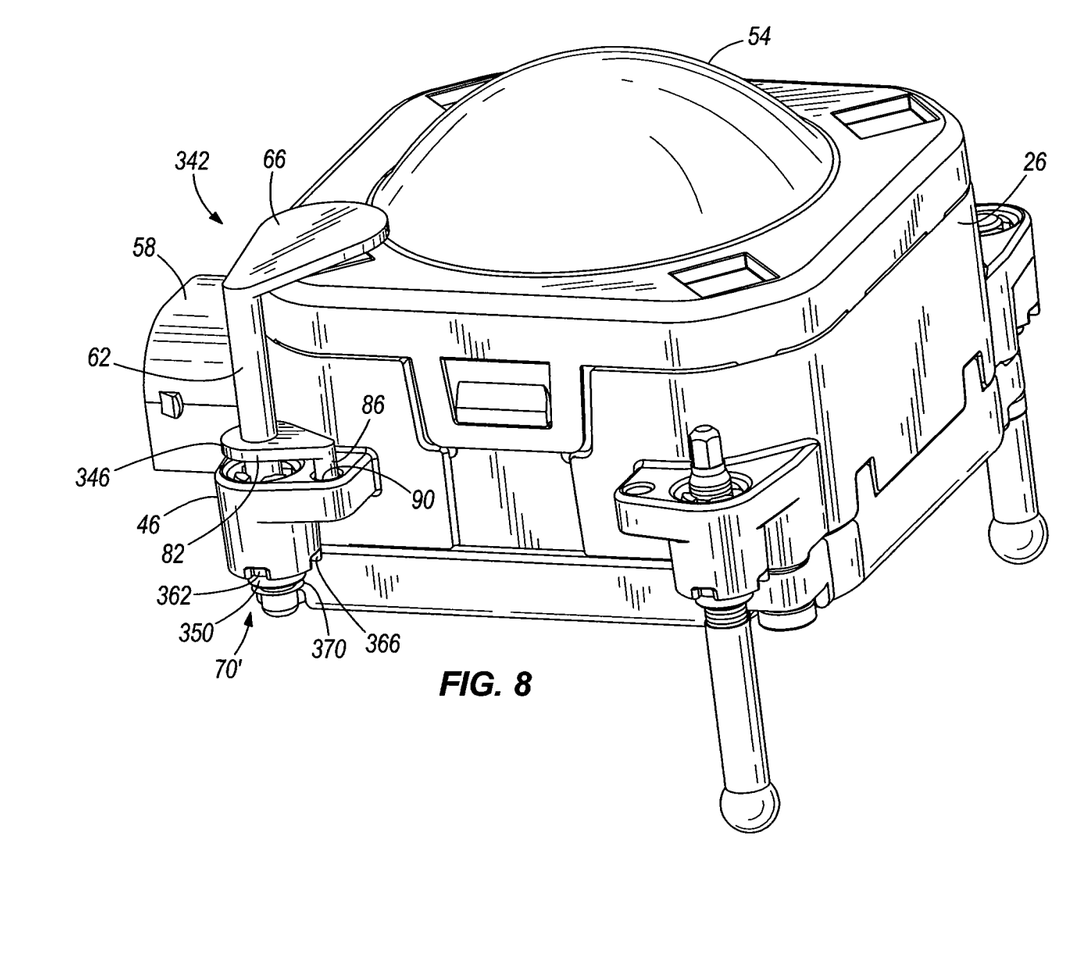
FIG. 8 is a perspective view of a sensor assembly including a cover assembly of a fourth embodiment.

FIGS. 6, 7, and 8 illustrate alternative embodiments of cover assemblies that are designed not to be rotatable in the fastener hole 50, but, rather, to cover the mirror 38 when coupled with the sensor 26, and that need to be removed if access to the mirror 38 is needed. FIG. 6 illustrates a cover assembly 142 that is similar to the cover assembly 42 in many respects. Like parts have being given like reference numbers. The cover assembly 142 includes anti-rotation members in the form of arms 146 extending from the rod portion 62. As illustrated in FIG. 6, the arms 146 include portions that extend substantially parallel to the rod portion 62 to engage adjacent surfaces of the mounting portion 46, thereby substantially preventing rotation of the rod portion 62 within the fastener hole 50. Therefore, the cover assembly 142 cannot substantially rotate about the axis of the rod portion 62. If the cover assembly 142 is installed on the sensor 26, the cover portion 66 is positioned over the mirror 38 to cover the mirror. If access to the mirror 38 is needed, the cover assembly 142 must be removed. Of course, the cover assembly 142 can be reinstalled to again cover the mirror 38, for example when the sensor alignment process is completed.

FIG. 7 illustrates another embodiment of a cover assembly 242 that is similar to the cover assembly 142. The cover assembly 242 includes anti-rotation members in the form of arms 246 extending from the rod portion 62. The arms 246 extend in a direction substantially normal to the rod portion 62. The arms 246 can have an included angle configured to receive a corner of the sensor housing, thereby anti-rotating the rod portion 62.

Figure 8A:
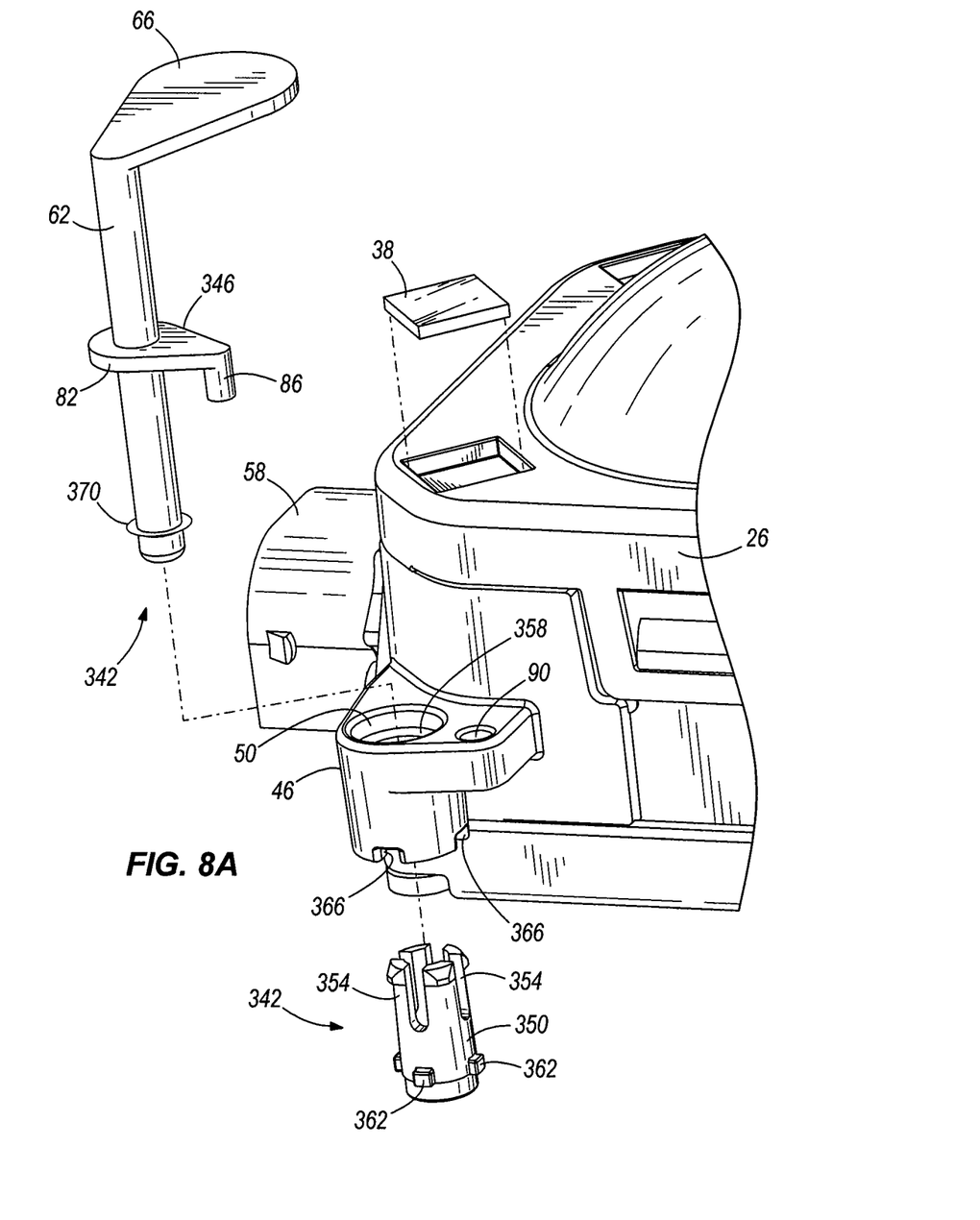
FIG. 8A is an exploded view of the sensor assembly of FIG. 8.

FIGS. 8 and 8A depict yet another embodiment of a cover assembly 342 that is similar to the cover assemblies 142 and 242. As such, like parts have been given like reference numbers. The cover assembly 342 includes an anti-rotation member in the form of arm 346. The arm 346 is substantially L-shaped, having a first portion 82 of the arm 346 that extends substantially normal to the rod portion 62 and a second portion 86 of the arm 346 that extends substantially parallel to the rod portion 62. The second portion 86 can be received in an aperture 90, which may be formed in the mounting portion 46 or other part of the sensor 26 housing. In alternate embodiments, the second portion 86 may be received by or engaged with any corresponding feature such as, for example, a slot, hole, rib, or other raised or recessed feature.

The cover assembly 342 is secured into the hole 50 in a somewhat different manner from those described above, and thus includes a slightly modified securing arrangement 70'. As best shown in FIG. 8A, the securing arrangement 70' of the cover assembly 342 includes a receiving member 350 that is inserted into the hole 50. The receiving member 350 includes a plurality of resilient members or arms 354 configured to deflect upon insertion into the hole 50 and then snap back to a substantially undeflected state after passing over a shoulder 358 in the hole 50. This secures the receiving member 350 in the hole 50. The illustrated receiving member 350 also includes anti-rotation features in the form of projections 362 that are received in apertures 366 in the mounting portion 46. Of course, in other embodiments, the apertures could be in the receiving member and the projections could be in the hole 50.

The rod portion 62 includes a flange or shoulder 370 configured to enter into and pass through the receiving member 350 once the receiving member is positioned in the hole 50. This helps to releasably secure the rod portion 62 in the hole 50. The underside of the flange 370 can be tapered or angled to facilitate insertion through the receiving member 350. The upper surface of the flange 370 is generally planar to make removal of the rod portion 62 somewhat more difficult, thereby preventing unintentional removal. However, the rod portion 62 can be removed as needed with a sufficient pulling force when the mirror 38 must be accessed for alignment of the sensor 26. The illustrated flange 370 is integrally formed with the rod portion 62, however, in other embodiments, the flange 370 can be a separate piece attached to the rod portion 62 or can be a snap ring that is installed on the rod portion 62 after the rod portion 62 is inserted through the receiving member 350.

It should be understood that the illustrated anti-rotation members of FIGS. 6, 7, and 8 are just some of the ways one skilled in the art could anti-rotate the cover assemblies 142, 242, 342 and that other anti-rotation methods could be substituted. It should also be noted that the using the cover assemblies 142, 242, and 342, which are not intended to be rotatable such that the cover portion 66 is movable between a covering and an uncovering position, means that the cover assemblies 142, 242, and 342 may be less resilient or flexible than the cover assembly 42.

Figure 9:
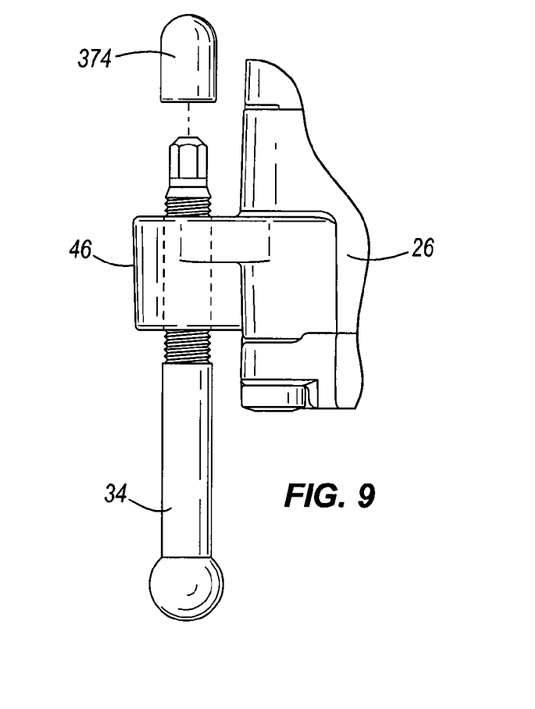
FIG. 9 is a partial side view of the sensor of FIG. 5 illustrating yet another cover feature in the form of a cap for an adjustment screw.

FIG. 9 illustrates yet another cover feature in the form of a cap 374 sized and configured to cover the ends of any of the fixed fastener 30 and the adjustment fasteners 34. The caps 374 are preferably made of plastic material that is the same color as the sensor housing and the cover portion 66 of the cover assembly 42, 142, 242, 342. By covering the fasteners 30, 34 with the caps 374, and in combination with the use of one of the cover assemblies 42, 142, 242, and 342, the sensor 26 can be suitably covered from an aesthetic standpoint, such that it is largely unnoticeable when mounted on a vehicle 10. The shiny metal of the fasteners 30, 34 and the reflective surface of the mirror 38 are covered. As the remainder of the sensor 26 is typically black, the black cover portion 66 and the black caps 374 adequately cover any non-black surfaces that might attract attention. Thus, the cover features 42, 142, 242, 342, and 374 provide cover features that are simple to use and attach, and much less expensive and cumbersome than custom radomes, whole-sensor covers, or specially-designed vehicle fascia currently being used to cover vehicle-mounted devices 26.

Various features of the invention are set forth in the following claims.

What is claimed is:

1. A cover assembly for a vehicle-mounted device having an alignment feature on a face of the device, the cover assembly comprising:
    a rod portion;
    a securing arrangement coupled to the rod portion to secure the cover assembly to the device;
    a cover portion coupled to the rod portion and configured to cover the alignment feature on the face of the device; and
    an anti-rotation member depending from the rod portion and configured to prevent rotation of the rod portion when the rod portion is installed on the device.

2. The cover assembly of claim 1, wherein the securing arrangement includes a resilient member configured to deflect upon insertion into a hole of the device, and then to resiliently return to an undeflected state after passing through the hole.

3. The cover assembly of claim 1, wherein the securing arrangement includes a receiving member for receiving the rod portion.

4. The cover assembly of claim 3, wherein the receiving member includes a resilient member configured to deflect upon insertion into a hole of the device, and then to resiliently return to an undeflected state after insertion into the hole.

5. The cover assembly of claim 3, wherein the rod portion includes a flange configured to pass through the receiving member.

6. The cover assembly of claim 1, wherein the anti-rotation member includes an arm extending substantially parallel to the rod portion.

7. The cover assembly of claim 6, wherein the arm includes two arms extending substantially parallel to the rod portion.

8. The cover assembly of claim 1, wherein the anti-rotation member includes an arm extending substantially normal to the rod portion.

9. The cover assembly of claim 8, wherein the arm includes two arms extending substantially normal to the rod portion.

10. A vehicle-mounted device assembly comprising:
    a vehicle-mounted device including an alignment feature on a face of the device, the alignment feature including at least one of a mirror, a prism, a lens, or a reflective device; and
    a cover assembly having a cover portion configured to cover the alignment feature on the face of the device, the cover assembly being mounted in an aperture in the device proximate to the alignment feature, wherein the cover assembly is rotatably mounted in the aperture such that the cover portion is movable between a first position, in which the cover portion does not cover the alignment feature, and a second position, in which the cover portion covers the alignment feature.

11. The vehicle-mounted device assembly of claim 10, wherein the vehicle-mounted device includes a plurality of mounting portions, each mounting portion including an aperture, one of the plurality of mounting portions being unused for mounting the device to the vehicle or for receiving an adjustment fastener, and wherein the cover assembly is mounted in the aperture in the unused mounting portion of the device.

12. The vehicle-mounted device assembly of claim 11, further comprising fasteners positioned in the apertures of mounting portions that do not receive the cover assembly, and a cap covering an end of each of the fasteners.

13. The vehicle-mounted device assembly of claim 10, wherein the cover portion covers the alignment feature when the cover assembly is mounted in the aperture, and wherein the cover assembly is removable from the aperture so that the alignment feature can be uncovered.

14. The vehicle-mounted device assembly of claim 13, wherein the cover assembly includes an anti-rotation member configured to prevent rotation of the cover assembly when mounted in the aperture.

15. The vehicle-mounted device assembly of claim 14, wherein the anti-rotation member is an arm of the cover assembly that engages the vehicle-mounted device.

16. The vehicle-mounted device assembly of claim 10, wherein the cover assembly further includes a rod portion coupled to the cover portion, and a securing arrangement coupled to the rod portion, the securing arrangement operable to secure the cover assembly in the aperture.

17. The vehicle-mounted device assembly of claim 16, wherein the securing arrangement includes a resilient member configured to deflect upon insertion into the aperture, and then to resiliently return to an undeflected state after passing through the aperture.

18. The vehicle-mounted device assembly of claim 16, wherein the securing arrangement includes a receiving member positioned in the aperture for receiving the rod portion.

19. A vehicle-mounted sensor assembly comprising:
    a vehicle-mounted sensor including a reflective alignment feature on a face of the sensor; and
    a cover assembly having a cover portion configured to cover the reflective alignment feature on the face of the sensor, the cover assembly being mounted in an aperture in the sensor proximate to the reflective alignment feature.

20. The vehicle-mounted sensor assembly of claim 19, wherein the vehicle-mounted sensor is one of a radar sensor and a lidar sensor.

21. The vehicle-mounted sensor assembly of claim 19, wherein the reflective alignment feature is a mirror.

* * * * *